(12) United States Patent
Xin et al.

(10) Patent No.: US 8,737,324 B2
(45) Date of Patent: May 27, 2014

(54) COMMUNICATION OF REDUNDANT SACCH SLOTS DURING DISCONTINUOUS TRANSMISSION MODE FOR VAMOS

(75) Inventors: Yan Xin, Kanata (CA); Shouxing Qu, Kanata (CA); Werner Kreuzer, Baiern (DE)

(73) Assignee: BlackBerry Limited, Waterloo (CA)

( * ) Notice: Subject to any disclaimer, the term of this patent is extended or adjusted under 35 U.S.C. 154(b) by 402 days.

(21) Appl. No.: 12/860,593

(22) Filed: Aug. 20, 2010

(65) Prior Publication Data

US 2011/0205947 A1   Aug. 25, 2011

Related U.S. Application Data

(63) Continuation of application No. PCT/EP2009/060848, filed on Aug. 21, 2009.

(51) Int. Cl.
*H04W 72/04* (2009.01)
(52) U.S. Cl.
CPC ..................................... *H04W 72/04* (2013.01)
USPC .......................................................... 370/329
(58) Field of Classification Search
USPC ......... 370/310, 312, 328, 329, 330, 336, 337, 370/431, 437, 442, 458, 464, 465, 468, 470, 370/493, 496, 498, 522, 529
See application file for complete search history.

(56) References Cited

U.S. PATENT DOCUMENTS

| | | | |
|---|---|---|---|
| 6,269,331 B1 * | 7/2001 | Alanara et al. ................. | 704/205 |
| 7,969,936 B2 * | 6/2011 | Bellier et al. ................. | 370/329 |
| 2001/0026560 A1 * | 10/2001 | Bellier et al. ................. | 370/477 |
| 2002/0090938 A1 * | 7/2002 | Dharia et al. ................. | 455/422 |
| 2004/0170148 A1 * | 9/2004 | Parkkinen et al. ............ | 370/337 |
| 2007/0275712 A1 * | 11/2007 | Sebire et al. ................. | 455/424 |
| 2010/0067440 A1 * | 3/2010 | Dick et al. .................... | 370/328 |

OTHER PUBLICATIONS

Nokia Siemens: "Introduction of VAMOS" 1,19-22, 3GPP TSG-Geran Meeting 42, May 11, 2009, XP002578731, Retrieved from the Internet: URL:http://www.3gpp.org/ftp/Specs/html-info/45001-CRs.htm> [retrieved on Apr. 21, 2010].

(Continued)

*Primary Examiner* — Edan Orgad
*Assistant Examiner* — Curtis A Alia
(74) *Attorney, Agent, or Firm* — Hanley, Flight & Zimmerman, LLC

(57) ABSTRACT

The application relates to a method for communication from a second mobile station to a base station or vice versa. In a given multiframe, a first SACCH slot associated with the second mobile station is communicated (i.e. received or transmitted or both) via the second VAMOS subchannel. In the same multiframe, a redundant second SACCH slot associated with the second mobile station is communicated. The communicating step is performed either by the second mobile station or by the base station. The second SACCH slot may be communicated via the second VAMOS subchannel, in case the second VAMOS subchannel is in DTX mode. In an alternative embodiment, the second SACCH slot may be communicated via a first VAMOS subchannel, in case the first VAMOS subchannel is in DTX mode, wherein the first and second VAMOS subchannels share a common time slot and have the same carrier frequency. Both embodiments may be combined: I.e. in case the second VAMOS subchannel is in DTX mode, the second SACCH slot is communicated via the second VAMOS subchannel, and in case the first VAMOS subchannel is in DTX mode, the second SACCH slot may be communicated via the first VAMOS subchannel.

26 Claims, 7 Drawing Sheets

(56) References Cited

OTHER PUBLICATIONS

Huawei Technologies Co et al: "DTX performance of SACCH for VAMOS," Internet Citation Feb. 16, 2009, pp. 1-5, XP002566226 Retrieved from the Internet: URL:http://www.3gpp.org/ftp/Specs/html-info/TDocExMtg--GP-41--26384.htm>[retrieved on Jan. 29, 2010].
3GPP: "3GPP TS 45.001 V9.0.0 3rd Generation Partnership Project; Technical Specification Group GSM/EDGE Radio Access Network; Physical Layer on the radio path;General description (Release 9)" May 1, 2009, XP002578732 Retrieved from the Internet: URL:http://www.turkcell.com.tr/c/oth/terminalpdf/45001-900.pdf> [retrieved on Apr. 21, 2010].
International Searching Authority, International Search Report and Written Opinion issued for PCT/EP2009/060848, mailed May 7, 2010, 14 pages.
Canadian Intellectual Property Office, "Office Action," issued in connection with Canadian Application No. 2,771,442, dated Oct. 24, 2013, 9 pages.

\* cited by examiner

Research in Motion Limited

| frame no | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| u | T | T | T | T | T | T | T | T | T | T | T | T | A | T | T | T | T | T | T | T | T | T | T | T | T | I |

Fig. 1a

| frame no | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| u1 | T |  | T |  | T |  | T |  | T |  | T |  | A1 | T |  | T |  | T |  | T |  | T |  | T |  |  |
| u2 |  | T |  | T |  | T |  | T |  | T |  | T |  |  | T |  | T |  | T |  | T |  | T |  | T | A2 |

Fig. 1b

| frame no | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Sub0 u | T | T | T | T | T | T | T | T | T | T | T | T | A | T | T | T | T | T | T | T | T | T | T | T | T | I |
| Sub1 u' | T' | T' | T' | T' | T' | T' | T' | T' | T' | T' | T' | T' | A' | T' | T' | T' | T' | T' | T' | T' | T' | T' | T' | T' | T' | I' |

Fig. 2a

| frame no | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Sub0 u1 | T |  | T |  | T |  | T |  | T |  | T |  | A1 | T |  | T |  | T |  | T |  | T |  | T |  |  |
| Sub0 u2 |  | T |  | T |  | T |  | T |  | T |  | T |  |  | T |  | T |  | T |  | T |  | T |  | T | A2 |
| Sub1 u1' | T' |  | T' |  | T' |  | T' |  | T' |  | T' |  | A1' | T' |  | T' |  | T' |  | T' |  | T' |  | T' |  |  |
| Sub1 u2' |  | T' |  | T' |  | T' |  | T' |  | T' |  | T' |  |  | T' |  | T' |  | T' |  | T' |  | T' |  | T' | A2' |

Fig. 2b

Research in Motion Limited

| frame no | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Sub0 | u | T | T | T | T | T | T | T | T | T | T | T | A | T | T | T | T | T | T | T | T | T | T | T | T | I |
| Sub1 | u' |   |   |   |   |   |   |   | A' |   |   | a' |   |   |   |   |   |   |   |   |   |   |   |   |   | I' |

Fig. 3a

| frame no | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Sub0 | u |   |   |   |   |   |   |   |   |   | a" |   | A |   |   |   |   |   |   |   |   |   |   |   |   | I |
| Sub1 | u' | T' | T' | T' | T' | T' | T' | T' | A' | T' | T' | T' | T' | T' | T' | T' | T' | T' | T' | T' | T' | T' | T' | T' | T' | I' |

Fig. 3b

| frame no | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Sub0 | u |   |   |   |   |   |   |   |   |   |   |   | A |   |   |   |   |   |   |   |   |   |   |   |   |   | I |
| Sub1 | u' |   |   |   |   |   |   |   | A' |   |   | a' |   |   |   |   |   |   |   |   |   |   |   |   |   | I' |

Fig. 3c

Research in Motion Limited

| frame no. | 0+i·26 | 1+i·26 | 2+i·26 | 3+i·26 | 4+i·26 | 5+i·26 | 6+i·26 | 7+i·26 | 8+i·26 | 9+i·26 | 10+i·26 | 11+i·26 | 12+i·26 | 13+i·26 | 14+i·26 | 15+i·26 | 16+i·26 | 17+i·26 | 18+i·26 | 19+i·26 | 20+i·26 | 21+i·26 | 22+i·26 | 23+i·26 | 24+i·26 | 25+i·26 |
|---|---|---|---|---|---|---|---|---|---|---|---|---|---|---|---|---|---|---|---|---|---|---|---|---|---|---|
| Sub1 i=0 | | | | | | | | | $A_0'$ | | $a_0'$ | | | | | | | | | | | | | | | $I_0'$ |
| Sub1 1 | | | | | | | | | $A_1'$ | | $a_1'$ | | | | | | | | | | | | | | | $I_1'$ |
| Sub1 2 | | | | | | | | | $A_2'$ | | $a_2'$ | | | | | | | | | | | | | | | $I_2'$ |
| Sub1 3 | | | | | | | | | $A_3'$ | | $a_3'$ | | | | | | | | | | | | | | | $I_3'$ |

Fig. 5a

| frame no. | 0+i·26 | 1+i·26 | 2+i·26 | 3+i·26 | 4+i·26 | 5+i·26 | 6+i·26 | 7+i·26 | 8+i·26 | 9+i·26 | 10+i·26 | 11+i·26 | 12+i·26 | 13+i·26 | 14+i·26 | 15+i·26 | 16+i·26 | 17+i·26 | 18+i·26 | 19+i·26 | 20+i·26 | 21+i·26 | 22+i·26 | 23+i·26 | 24+i·26 | 25+i·26 |
|---|---|---|---|---|---|---|---|---|---|---|---|---|---|---|---|---|---|---|---|---|---|---|---|---|---|---|
| Sub1 i=0 | | | | | | | | | $A_0'$ | | $a_3'$ | | | | | | | | | | | | | | | $I_0'$ |
| Sub1 1 | | | | | | | | | $A_1'$ | | $a_2'$ | | | | | | | | | | | | | | | $I_1'$ |
| Sub1 2 | | | | | | | | | $A_2'$ | | $a_1'$ | | | | | | | | | | | | | | | $I_2'$ |
| Sub1 3 | | | | | | | | | $A_3'$ | | $a_0'$ | | | | | | | | | | | | | | | $I_3'$ |

Fig. 5b

| frame no. | 0+i·26 | 1+i·26 | 2+i·26 | 3+i·26 | 4+i·26 | 5+i·26 | 6+i·26 | 7+i·26 | 8+i·26 | 9+i·26 | 10+i·26 | 11+i·26 | 12+i·26 | 13+i·26 | 14+i·26 | 15+i·26 | 16+i·26 | 17+i·26 | 18+i·26 | 19+i·26 | 20+i·26 | 21+i·26 | 22+i·26 | 23+i·26 | 24+i·26 | 25+i·26 |
|---|---|---|---|---|---|---|---|---|---|---|---|---|---|---|---|---|---|---|---|---|---|---|---|---|---|---|
| Sub1 i=0 | | | | | | | | | $A_0'$ | | $a_2'$ | | | | | | | | | | | | | | | $I_0'$ |
| Sub1 1 | | | | | | | | | $A_1'$ | | $a_3'$ | | | | | | | | | | | | | | | $I_1'$ |
| Sub1 2 | | | | | | | | | $A_2'$ | | $a_0'$ | | | | | | | | | | | | | | | $I_2'$ |
| Sub1 3 | | | | | | | | | $A_3'$ | | $a_1'$ | | | | | | | | | | | | | | | $I_3'$ |

Fig. 5c

Research in Motion Limited

Research in Motion Limited

| frame no | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Sub0 u | T | T | T | T | T | T | T | T | T | T | T | T | A | T | T | T | T | T | T | T | T | T | T | T | T | l |
| Sub1 u' | | | | | | | | | A' | | | a' | | | | | | | | | | | | | | l' |

Fig. 7a

| frame no | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Sub0 u | | | | | | | | | | | | | A | | | | | | | | | | | | | l |
| Sub1 u' | T' | T' | T' | T' | T' | T' | T' | T' | A' | T' | T' | T' | T' | T' | T' | T' | T' | T' | T' | T' | T' | T' | T' | T' | T' | l' |

Fig. 7b

| frame no | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Sub0 u | | | | | | | | | | | | | A | | | | | | | | | | | | | l |
| Sub1 u' | | | | | | | | | A' | | | a' | | | | | | | | | | | | | | l' |

Fig. 7c

COMMUNICATION OF REDUNDANT SACCH SLOTS DURING DISCONTINUOUS TRANSMISSION MODE FOR VAMOS

CROSS REFERENCE TO RELATED APPLICATIONS

This application is a continuation of prior Application No. PCT/EP09/60848, filed Aug. 21, 2009, the entire contents of which are hereby expressly incorporated herein by reference.

TECHNICAL FIELD

The present application relates to wireless communications. In particular, the application relates to communication of SACCH (Slow Associated Control Channel) slots in a GSM EDGE Radio Access Network (GERAN) using VAMOS (Voice services over Adaptive Multi-user on One slot) in case of discontinuous transmission (DTX).

BACKGROUND

Voice services over Adaptive Multi-user on One Slot (VAMOS) allows for voice capacity enhancement in GSM/EDGE Radio Access Networks (GERAN).

In GSM, each mobile station is assigned to one of eight available time slots per TDMA frame. In VAMOS, the voice capacity in GERAN can be improved by multiplexing two users, i.e. two mobile stations, on the same time slot and the same carrier frequency; the multiplexing of two mobile stations on a common time slot may be done in downlink direction (i.e. from the base station to the mobile station) and in uplink direction (i.e. from the mobile station to the base station). When multiplexing two mobile stations on a common time slot, the communication with the first mobile station is performed via a first VAMOS subchannel, and the communication with the second mobile station is performed via a second VAMOS subchannel. The users form a VAMOS pair.

In GSM, Discontinuous Transmission (DTX) is used when a speech silent period is detected during a speech connection. DTX operation is mandatory for GSM mobile stations.

The performance of the active Traffic Channel (TCH) in VAMOS can be improved if the TCH of the other user in the same VAMOS pair is in silence (inactive TCH), i.e. if the VAMOS subchannel of the other user is in DTX mode. This is due to the reduced interference originating from the VAMOS subchannel in DTX mode. However, the related Slow Associated Control Channel (SACCH) does not obtain such a performance benefit because a SACCH slot is transmitted per multiframe, regardless whether the VAMOS subchannel is in DTX mode or not. Thus, the SACCH of the VAMOS subchannel in DTX mode interferes with the SACCH of the other VAMOS subchannel.

BRIEF DESCRIPTION OF THE DRAWINGS

In the following, preferred embodiments are described with reference to the accompanying drawings, wherein FIG. 1a illustrates an example of a legacy GSM 26-frame multiframe for full rate;

FIG. 1b illustrates an example of a legacy GSM 26-frame multiframe for half rate;

FIG. 2a illustrates an example of a 26-frame multiframe for VAMOS and full rate;

FIG. 2b illustrates an example of a 26-frame multiframe for VAMOS and half rate;

FIG. 3a illustrates an example of transmitting redundant SACCH information in downlink direction for full rate in case subchannel 1 is in DTX mode;

FIG. 3b illustrates an example of transmitting redundant SACCH information in downlink direction for full rate in case subchannel 0 is in DTX mode;

FIG. 3c illustrates an example of transmitting redundant SACCH information in downlink direction for full rate in case subchannels 0 and 1 are in DTX mode;

FIG. 5a illustrates a first embodiment of a repetition scheme for repetition of SACCH information;

FIG. 5b illustrates a second embodiment of a repetition scheme for repetition of SACCH information;

FIG. 5c illustrates a third embodiment of a repetition scheme for repetition of SACCH information;

FIG. 6a illustrates an example of transmitting redundant SACCH information in downlink direction for half rate in case the downlink connection of user u1' is in DTX mode;

FIG. 6b illustrates an example of transmitting redundant SACCH information in downlink direction for half rate in case the downlink connection of user u2' is in DTX mode;

FIG. 6c illustrates an example of transmitting redundant SACCH information in downlink direction for half rate in case the downlink connection of user u1 is in DTX mode;

FIG. 6d illustrates an example of transmitting redundant SACCH information in downlink direction for half rate in case the downlink connection of user u2 is in DTX mode;

FIG. 7a illustrates an example of transmitting redundant SACCH information in uplink direction for full rate in case subchannel 1 is in DTX mode;

FIG. 7b illustrates an example of transmitting SACCH information in uplink direction for full rate in case subchannel 0 is in DTX mode;

FIG. 7c illustrates an example of transmitting redundant SACCH information in uplink direction for full rate in case subchannels 0 and 1 are in DTX mode;

DETAILED DESCRIPTION

Figure 4:
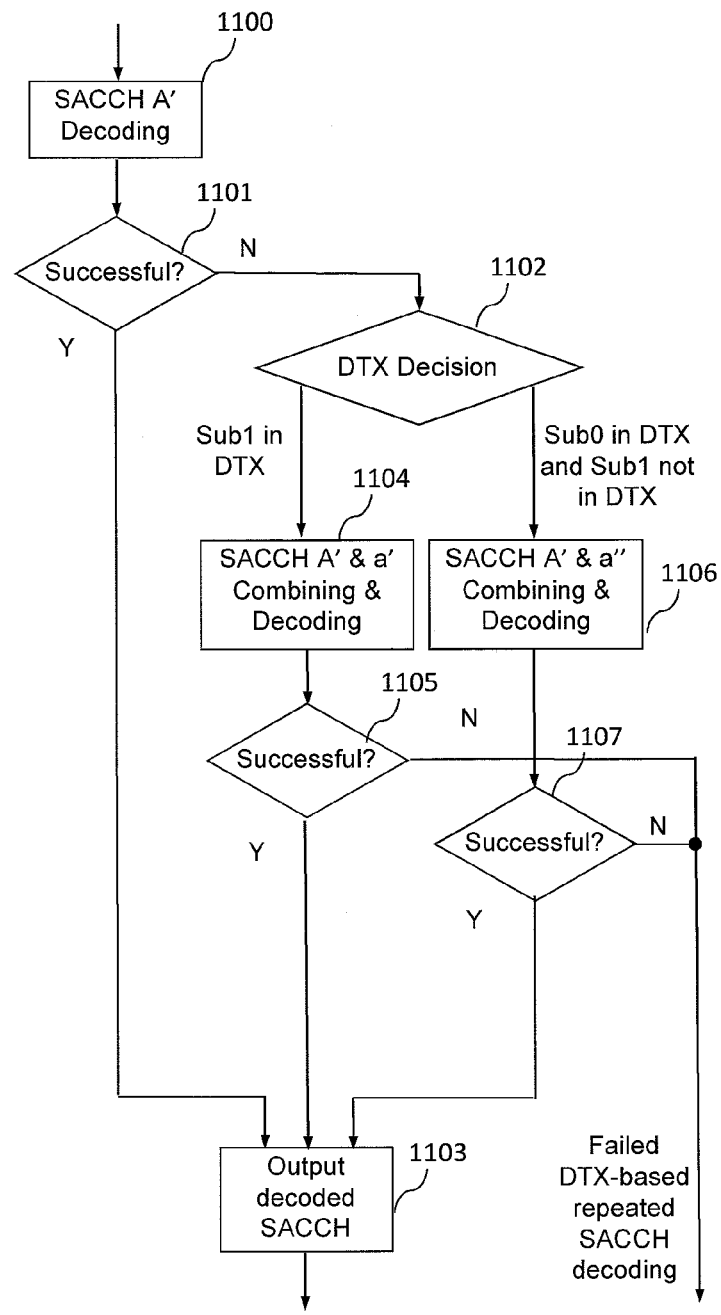
FIG. 4 illustrates an example of the flow chart for the decoding procedure for user u'.

VAMOS is a new feature for voice capacity enhancement in GSM/EDGE Radio Access Network (GERAN). Certain aspects of VAMOS are discussed in the document GP-081949, "Work Item Description: Voice services over Adaptive Multi-user channels on One Slot", source: WI Rapporteurs, GERAN#40, Miami, US, which is hereby incorporated by reference.

Discontinuous Transmission (DTX) operation is mandatory for all GSM mobile stations. DTX is discussed in the documents 3GPP TS 46.031, "Full rate speech; Discontinuous Transmission (DTX) for full rate speech traffic channels"; 3GPP TS 46.041, "Half rate speech; Discontinuous Transmission (DTX) for half rate speech traffic channels", and 3GPP TS 26.093, "Mandatory speech codec speech processing functions Adaptive Multi-Rate (AMR) speech codec; Source controlled rate operation". These documents are hereby incorporated by reference.

The performance of the active Traffic Channel (TCH) in VAMOS can be improved if the TCH of the other user in the same VAMOS pair is in silence (inactive TCH), i.e. if the VAMOS subchannel of the other user is in DTX mode. However, the related Slow Associated Control Channel (SACCH) cannot obtain such a performance benefit because SACCH is always transmitted, regardless whether the VAMOS subchannel is in DTX mode or not. Thus, the SACCH of the VAMOS subchannel in DTX mode interferes with the SACCH of the other VAMOS subchannel.

In the present application, new methods for SACCH performance enhancement for VAMOS are discussed. One preferred method is DTX-based repeated SACCH, which allows improvement of the SACCH performance in DTX mode. DTX-based repeated SACCH transmits repeated SACCH information through inactive TCHs during DTX mode while reducing delays for decoding of SACCH blocks. Preferably, in DTX-based repeated SACCH further the SACCH frame in one VAMOS subchannel is shifted in comparison to the SACCH frame in the other VAMOS subchannel.

Legacy Channel Organization

Legacy GSM Frame Structure

The GSM frame structure is discussed in the document 3GPP TS 45.001, "GERAN; Physical layer on the radio path; General description", which is hereby incorporated by reference.

The multiplexing access of GSM is Time Division Multiple Access (TDMA). A TDMA frame corresponding to a carrier frequency includes eight time slots. Such a time slot transmits speech data and the associated control signalling for a single user. FIG. 1a shows the structure of the legacy GSM 26-frame multiframe for full rate operation, whereas FIG. 1b shows the structure of a legacy GSM 26-frame multiframe for half rate operation. In FIGS. 1a and 1b, "T" denotes the TDMA frame for transmitting TCH. "A", "A1" and "A2" denote TDMA frames for transmitting SACCH and "I" denotes an idle frame. Each of the TDMA frames includes 8 time slots, with each time slot associated to a particular user. Each slot corresponds to a burst. A normal burst contains 116 encrypted symbols. Moreover, such normal burst contains a training sequence code (TSC) having 26 symbols.

In the following drawings only a single user representative for the 8 users per TDMA frame is shown.

In FIG. 1a, full rate TCH (TCH/FS) frames and SACCH (SACCH/FS) frames are used. In FIG. 1a, "u" denotes a single user. As discussed above, a mobile station uses only a single time slot of 8 time slots per TDMA frame.

In FIG. 1b, half rate TCH (TCH/HS) frames and half rate SACCH (SACCH/HS) frames are used. In FIG. 1b, "u1" and "u2" (shaded) denote two users using alternative TDMA frames. As discussed above, each user u1, u2 uses only a single time slot of the 8 time slots per TDMA frame.

SACCH Coding

According to cited document 3GPP TS 45.001, the transmission of one multiframe having 26 TDMA frames requires 120 ms. Encoding of a SACCH block is specified in the document 3GPP TS 45.003, "GERAN; Channel coding", which is hereby incorporated by reference. According to this document, a SACCH information block of 184 bits is encoded with the concatenation of a FIRE code and a rate ½ convolutional code. The coded SACCH block including 456 bits is then interleaved and mapped into four time slots of four TDMA frames for transmitting SACCH.

As shown in FIGS. 1a and 1b, each 26-frame multiframe transmits only one SACCH frame and thus only one SACCH slot for a particular user. Thus, it requires four 26-frame multiframes to transmit a full SACCH block, i.e. a SACCH block period is 480 ms.

SACCH transmits the ordered mobile station (MS) power control, ordered timing advance and system information on the downlink (DL) and the actual MS power control, actual timing advance and measurement reports on the uplink (UL).

Therefore, every 480 ms (i.e. four 26-frame multiframes or 104 TDMA frames) the power level information for normal power control is updated and measurement reports for TCH are transmitted.

A high performance of control channels such as SACCH is important for the network to achieve full capacity. Thus, there is a need to improve the performance of SACCH transmission, especially for SACCH associated with AMR (adaptive-multi rate).

Repeated SACCH was investigated said document GP-052088 and specified in document 3GPP TS 44.006, "Mobile Station-Base Station System (MS-BSS) interface; Data Link (DL) layer specification". Both documents are hereby incorporated by reference.

In Repeated SACCH, in addition to the SACCH block received in the current SACCH period, the same SACCH block may be retransmitted in the next SACCH period(s) and combined with the previously received SACCH block for decoding. The procedure of Repeated SACCH is as follows. On the downlink (DL), if the SACCH block decoding fails, then the mobile station (MS) will set a SACCH Repetition Request (SRR) in the next uplink SACCH block as "Repeated SACCH required". When the base station (BS) receives this SRR bit correctly, the base station may repeat this SACCH block in the next SACCH period. On the uplink (UL), if the SACCH block decoding fails, then the BS will set SACCH Repetition Order (SRO) in the next downlink SACCH block as "Repeated SACCH required". When the MS receives this SRO bit correctly, the MS will repeat this SACCH block in the next SACCH period.

As shown in cited document GP-052088, the link performance of the Repeated SACCH scheme yields performance gain compared to the normal SACCH without repetition of SACCH frames.

SACCH in VAMOS

Basic Concept of VAMOS

In VAMOS mode, the voice capacity in GERAN can be improved by multiplexing two users on the same time slot and the same carrier frequency on either DL or UL. One user communicates via VAMOS Subchannel 0, whereas the other user communicates via VAMOS Subchannel 1.

VAMOS can find applications for the GERAN speech channels such as TCH/FS, TCH/HS, TCH/EFS, TCH/AFS, TCH/AHS and TCH/WFS and the associated signaling channels, in which data are GMSK (Gaussian Minimum Shift keying) modulated.

For VAMOS, the adaptive QPSK (Quadrature Phase Shift Keying) modulation, AQPSK modulation, is employed on the DL. Here, two users' data are mapped to two orthogonal subchannels, respectively. On UL, both users in a VAMOS pair transmit GMSK signals on the same radio resource. A pair of well-designed training sequences is used for a VAMOS pair to distinguish the data of the users on both DL and UL. E.g. the bursts in VAMOS Subchannel 0 and VAMOS Subchannel 1 employ legacy training sequences and new training sequences, respectively.

As discussed in cited document GP-081949, VAMOS is designed to be fully backward-compatible with legacy GSM terminals with or without DARP (downlink advanced receiver performance) capability. Therefore, in VAMOS at least one subchannel (e.g. VAMOS Subchannel 0) should keep the legacy GSM frame structure for transmission of TCH and SACCH of the legacy mobile stations. A MS which cannot support VAMOS is mapped to VAMOS Subchannel 0. A VAMOS compliant MS can use either a legacy training sequence or a new training sequence, and may be mapped to either of the VAMOS subchannels.

VAMOS Frame Structure

By extending the legacy GSM frame structure shown in FIGS. 1a and 1b, the 26-frame multiframe structure for VAMOS is obtained.

FIGS. 2a and 2b represent a 26-frame multiframe structure, where both VAMOS subchannels 0 and 1 (see "Sub0" and "Sub1" in FIGS. 2a and 2b) adopt the legacy multiframe structure. In FIG. 2a, full rate TCH (TCH/FS) frames T, T' and SACCCH (SACCH/FS) frames A, A' are used. Here, "u" and "u'" denote a pair of VAMOS users in full rate. In FIG. 2b, half rate TCH/HS frames T, T' and half rate SACCH/HS frames A1, A1', A2, A2' are used. "u1" and "u2" (shaded) denote two users using alternative frames in subchannel 0; similarly, "u1'" and "u2'" (shaded) denote two users in subchannel 1.

DTX Operation in VAMOS

In DTX mode, when a speech silent period is detected through voice activity detection (VAD) during a speech connection, only the SID (silence descriptor) slots and the SACCH slots are transmitted in the user's channel. This is defined in the document 3GPP TS 45.008, "GERAN; Radio subsystem link control", which is hereby incorporated by reference. SACCH is always transmitted regardless of the DTX status.

As discussed in cited documents 3GPP TS 46.031, 3GPP TS 46.041 and 3GPP TS 26.093, the purposes of DTX operation are to save transmit power in the MS, and to reduce the overall interference level over the air interface.

In general, for full rate, half rate and adaptive multi-rate speech channels, the DTX operates as follows:

At the transmit (Tx) side, a Voice Activity Detector (VAD) monitors the speech status (silence or not). When the VAD detects that there is silence in speech, the background acoustic noise on the Tx side is evaluated and noise characteristics parameters are transmitted to the receive (Rx) side through silence descriptor (SID) frames. In general, during DTX, for full rate and half rate speech channels, some fixed TDMA frame positions in the multiframe structure are reserved for SID slots of the considered user as defined in cited document 3GPP TS 45.008. The following table 1 lists the TDMA frames transmitting SID slots of the considered user for full rate (TCH/FS) and half rate (TCH/HS).

TABLE 1

TDMA frames for carrying SID information

| Type of channel | TDMA frame subset always to be transmitted TDMA frame number (FN) modulo 104 |
|---|---|
| TCH/FS | 52, 53, 54, 55, 56, 57, 58, 59 |
| TCH/HS, subchannel 0 | 0, 2, 4, 6, 52, 54, 56, 58 |
| TCH/HS, subchannel 1 | 14, 16, 18, 20, 66, 68, 70, 72 |

For adaptive multi-rate speech channels, following the SID_FIRST slot, SID_UPDATE slots which transmit noise characteristics parameters are sent every $8^{th}$ speech frame (20 ms per speech frame or four TDMA frames). This is specified in cited document 3GPP TS 26.093.

At the receive (Rx) side, the receiver will update generated comfort noise based on the received parameters when DTX is switched on.

If a user is in DTX operation, there is no speech data to be transmitted in the respective time slots of the TCH frames. The other user in the VAMOS pair will benefit from this DTX operation since on the DL, the modulation type will be changed from QPSK to GMSK. On the UL, for most of the TCHs of the active user, there is no intra-cell interference from the other user of the VAMOS pair. However, the SACCH performance of both VAMOS users cannot obtain any benefit from DTX operation. It is desirable to significantly improve the SACCH performance.

Repeated SACCH

For SACCH performance enhancement in VAMOS, Repeated SACCH has been considered, see. e.g. document GP-090737, "SACCH performance analysis for VAMOS half rate channels", GERAN#42, Shenzhen, China, which is hereby incorporated by reference.

However, several issues related to Repeated SACCH have to be considered:

Delay: Repeated SACCH scheme may need multiple SACCH periods to completely decode a SACCH block. This may cause delays for power control and/or handover decision.

Compatibility: Repeated SACCH is a Rel. 6 feature as discussed in cited document 3GPP TS 44.006. This limits the application of the Repeated SACCH method to mobile stations which are compliant with Rel. 6 for use in VAMOS.

Although the Repeated SACCH scheme can improve the SACCH performance in VAMOS during DTX (note that Repeated SACCH can also improve SACCH performance for the non-DTX cases), there are some disadvantages as discussed above. These disadvantages motivate to propose a new method as discussed below for SACCH performance enhancement for VAMOS during DTX.

It should be noted that Repeated SACCH is a method for SACCH performance improvement, which is independent of DTX operation.

DTX-Based Repeated SACCH

General Remarks

In the following, a new method for improving the SACCH performance is discussed, which is referred to as DTX-based repeated SACCH.

For improving the SACCH performance of a VAMOS compliant mobile station e.g. assigned to VAMOS subchannel 1, in DTX-based repeated SACCH, repeated SACCH information is transmitted through silent TCH slots when DTX is switched on. Thus, in DTX-based repeated SACCH, in addition to a SACCH slot per multiframe, a redundant second SACCH slot (or a plurality of redundant SACCH slots) is transmitted per multiframe in case of DTX. The redundant SACCH slot is transmitted via the respective subchannel which is in DTX mode. It should be noted that the TDMA frame comprising the redundant SACCH slot typically carries non-SACCH slots, such as TCH slots, in other time slot of the TDMA frame (since not all time slots are in DTX mode at the same time). These non-SACCH slots are assigned to other users than the user assigned to the redundant SACCH slot. Thus, the resulting TDMA frame carrying the redundant SACCH information is a "mixed" TDMA frame comprising SACCH information and TCH information.

Similar to the Repeated SACCH scheme discussed in cited document 3GPP TS 44.006, in DTX-based repeated SACCH, at the receiver the received repeated SACCH signals can be combined together for decoding of one SACCH block. However, unlike to Repeated SACCH, in DTX-based repeated SACCH, the repeated SACCH signals are received and decoded within the SACCH period of 480 ms. Also in DTX-based repeated SACCH, there is preferably no signaling required to order/request transmission of the repetition of a SACCH block.

Preferably, in DTX-based repeated SACCH further the SACCH frame in one VAMOS subchannel is shifted in comparison to the SACCH frame in the other VAMOS subchannel. E.g. one may keep the legacy multiframe structure for VAMOS Subchannel 0 in a VAMOS pair and rearranges the TCH and SACCH frame positions within VAMOS Subchannel 1. This allows that each SACCH frame is always paired with a TCH frame. This shifting of the SACCH frame alone can yield an improvement in SACCH performance when DTX is turned on. Due to the shifting of the SACCH frame, there will be a small performance degradation of the TCH.

The concept of shifting the SACCH frame in one VAMOS subchannel in comparison to the SACCH frame in the other VAMOS subchannel is also discussed in detail in the Applicant's international patent application PCT/EP2009/060124 filed on Aug. 4, 2009 and having the title "Frame Mapping for GERAN Voice Capacity Enhancement". This prior application, in particular its remarks to the shifting of the SACCH frames, is hereby incorporated by reference. The concept discussed in this prior application can be combined with the concept discussed in this application. In particular, the prior application's teaching relating to the position of a shifted SACCH frame may be applied also in the present application.

However, for speech TCH/FS, TCH/EFS and TCH/HS, as defined in Table 1 above, the user's slots in some TDMA frames are reserved for transmission of comfort noise (i.e. SID slots). The TDMA frames transmitting SACCH frames may interfere some SID slots. Therefore, a mapping scheme is preferred which avoids the interference between SACCH information and SID information.

The shift may be realized e.g. by keeping the position of the SACCH frame for the user in VAMOS subchannel 0 unchanged and by rearranging the position of the SACCH frame for the user in VAMOS subchannel 1 in the 26 multiframe structure. Therefore, a TDMA frame for transmission of the SACCH of one VAMOS user is paired with a TDMA frame for transmission of a TCH of the other VAMOS user of the same VAMOS pair. Thus, the DTX operation of one VAMOS user results in benefits for the SACCH performance of the other VAMOS user. It should be noted that like the SACCH frame used by the user in VAMOS subchannel 0, this shifted SACCH frame used by the user in VAMOS subchannel 1 is also always transmitted, regardless whether the VAMOS subchannel 1 is in DTX mode or not.

In DTX-based repeated SACCH, when the intended transmission of redundant SACCH information in a time slot conflicts with the intended transmission of TCH or SID information in this time slot, this time slot will preferably carry the TCH or SID information, i.e. the TCH or SID information has priority over the redundant SACCH information.

Alternatively, in DTX-based repeated SACCH, when the intended transmission of redundant SACCH information in a time slot conflicts with the intended transmission of SID information in this time slot, this time slot will preferably carry the redundant SACCH information, i.e. the redundant SACCH information has priority over the SID information. SID information will be delayed for transmission.

As shown in FIGS. 3a-3c and FIGS. 6a-6d, the redundant SACCH slots in DTX-based repeated SACCH do not collide with SID slots in TCH/FS and TCH/HS (given in Table 1).

The method may also be combined with Repeated SACCH (as e.g. specified in cited document 3GPP TS 44.006) when DTX-based repeated SACCH decoding fails. In this case, the SACCH block is repeated after transmission of four subsequent multiframes carrying the SACCH block.

Downlink Direction and Full Rate

In the following it is assumed that legacy SACCH mapping and decoding are maintained for VAMOS subchannel 0. A preferred embodiment of DTX-based repeated SACCH for full rate speech channels is shown in FIGS. 3a-3c.

SACCH A' for user u' using subchannel 1 is shifted from the frame position (here: 12) used in VAMOS subchannel 0 to a different frame position, for example from frame 12 to frame 8. Thus, the SACCH slot for user u' is in a different TDMA frame (here: TDMA frame 8) than the SACCH slot for user u (which is in TDMA frame 12).

In the first case as shown in FIG. 3a, subchannel 1 of user u' is in DTX mode. The SACCH performance for the other user u is improved. The improvement of the SACCH performance for user u is due to the fact that in DTX mode of subchannel 1 user's u time slot of SACCH frame A does not coincide with the used time slot of SACCH frame A' but coincides with a silent time slot in subchannel 1. This reduces the interference and thus improves the SACCH performance for user u.

For user u', in addition to the shifted SACCH transmitted e.g. in frame 8, another redundant SACCH slot a' is transmitted in another TDMA frame via subchannel 1. The SACCH slot a' may deliver the same SACCH information for user u' which was delivered for user u' in SACCH frame A'. The transmission of SACCH slot a' is controlled by the BS. For preventing collision with reserved TDMA frames for SID (see Table 1), the redundant SACCH slot a' may be transmitted e.g. in frame 11 as shown in FIG. 3a.

This additional SACCH information in SACCH slot a' is detected by user u' without knowledge of the DTX status of VAMOS subchannel 1. The procedure on decoding of SACCH blocks for user u' is described later on in connection with FIG. 4.

It should be noted that in the first case when subchannel 1 is in DTX mode, the DTX operation in VAMOS subchannel 1 yields performance benefits for SACCH in both VAMOS subchannels 0 and 1: As discussed above, the improvement of the SACCH performance for user u is due to the fact that in DTX mode of subchannel 1 the used time slot of SACCH frame A coincides with a silent time slot in subchannel 1. This reduces the interference and thus improves the SACCH performance for user u. The improvement of the SACCH performance for user u' is due to the fact that redundant SACCH information is transmitted in an additional SACCH slot a'.

In the second case when subchannel 0 is in DTX operation (see FIG. 3b), it is optional that for user u', in addition to the shifted SACCH transmitted in frame 8, another redundant SACCH slot a'' is transmitted through another TDMA frame in VAMOS subchannel 0. Preferably, the additional SACCH slot a' is in TDMA frame 10. The additional SACCH slot a'' may deliver the same SACCH information for user u' which was delivered for user u' in SACCH frame A'. The transmission of SACCH slot a' is controlled by the BS.

Thus, in case subchannel 1 is in DTX mode, the redundant SACCH slot a' is transmitted via subchannel 1 (see FIG. 3a), whereas in case subchannel 0 is in DTX mode, the redundant SACCH slot a'' is transmitted via subchannel 0 (see FIG. 3b).

This redundant SACCH information in SACCH slot a'' may be detected by user u' without knowledge of the DTX status of VAMOS subchannel 0. The ciphering key for transmission of SACCH slot a'' in VAMOS subchannel 0 is the same as the key used by user u' in VAMOS subchannel 1. The procedure on decoding of SACCH blocks for user u' is described later on in connection with FIG. 4.

For using an additional SACCH slot a'' in subchannel 0, the mobile station of user u' is configured for receiving both SACCH slot a'' in subchannel 0 and the time slot of TCH frame T' in subchannel 1.

It should be noted that the DTX operation in VAMOS subchannel 0 results in a SACCH performance improvement only for user u' in VAMOS subchannel 1. The SACCH performance improvement for user u' arises from two aspects: In DTX mode of subchannel 0, the used time slot of SACCH frame A' coincides with a silent time slot in subchannel 0.

Moreover, redundant SACCH information for user u' is transmitted in an additional SACCH slot a".

In a third case when both users u and u' are in DTX operation (see FIG. 3c), the transmission and decoding of SACCH information may be the same as in the first case above (see FIG. 3a).

It should be noted that if the mobile station of user u in VAMOS subchannel 0 is VAMOS compliant, then the concept for SACCH transmission in VAMOS subchannel 1 in FIGS. 3a-3c can be applied to VAMOS subchannel 0 as well. E.g. in case the mobile station of user in VAMOS subchannel 0 is VAMOS compliant and subchannel 0 is in DTX mode, a redundant SACCH slot associated with user u may be transmitted in subchannel 0. Thus, the transmission of redundant SACCH information may not be limited to the user in VAMOS subchannel 1. If the user u in VAMOS subchannel 0 is not a legacy MS, the MS may transmit/receive a redundant SACCH slot in an analogous way as the user u' in VAMOS subchannel 1.

An example of the flow chart for the decoding procedure for user u' in DTX-based repeated SACCH is illustrated in FIG. 4.

In step 1100, the SACCH block is decoded based on the SACCH information in four frames A' in four subsequent multiframes. In step 1101 it is decided whether this decoding step 1100 was successful without errors detected by the FIRE decoder. If the decoding step 1100 was successful, the decoded SACCH block is output in step 1103. If the decoding step 1100 was not successful and if subchannel 1 was in DTX (see FIG. 3a and FIG. 3c), the SACCH block is decoded in step 1104 by using the information of one or more SACCH slots a' (such multiple SACCH slots a' are in different multiframes). E.g. the combination of the SACCH A' block and the (partial) SACCH a' block may be decoded. It should be noted that only a partial SACCH a' block (i.e. less than 4 time slots) may be available for decoding (e.g. when a time slot for redundant SACCH collides with a time slot for TCH or SID and TCH or SID has priority). If the decoding step 1104 is successfully (see decision 1105) without errors detected by the FIRE decoder, the decoded SACCH block will be output in step 1103.

It should be noted that decoding of SACCH block based only on SACCH slots a' in four subsequent multiframes alone may also be carried out before this information is combined with SACCH block A' (not shown).

FIG. 4 shows a decision step 1102 for DTX decision. However, it is not necessary to actually implement the decision step 1102. If decoding of SACCH A' fails, then the receiver just may try to combine A' and a' (or A' and a") and to do decoding though the receiver may not know whether a' (a") has been transmitted. However, taking the DTX mode into account (by implementing the decision step 1102) may further optimize the implementation of the decoding procedure. Typically, the scheduler in the receiver is aware of the DTX status. This additional information can be exploited to avoid useless decoding attempts.

If subchannel 0 was in DTX and subchannel 1 was not in DTX (see FIG. 3b), the SACCH block is decoded in step 1106 by using the information of one or more SACCH slots a" (such multiple SACCH slots a" are in different multiframes). E.g. the combination of the SACCH A' block and the (partial) SACCH a" block may be decoded. If the decoding step 1106 is successfully (see decision 1107) without errors detected by the FIRE decoder, the decoded SACCH block will be output in step 1103. It should be noted that decoding of SACCH block based only on SACCH slots a" in four subsequent multiframes alone may also be carried out before this information is combined with SACCH block A' (not shown).

If the DTX-based repeated SACCH is incorrectly decoded, Repeated SACCH (see e.g. cited document 3GPP TS 44.006) may be further activated by setting SACCH Repetition Request (SRR) in the next uplink SACCH block as "Repeated SACCH required". In this case, the SACCH block is repeated afterwards.

FIGS. 5a-5c illustrate three examples for the repetition of the SACCH block by using redundant SACCH time slots in four subsequent 26-frame multi-frames. In FIGS. 5a-5c, each of the horizontal lines with i=0, 1, 2, 3 corresponds to a 26-frame multiframe. In FIGS. 5a-5c, the SACCH slot $a_i'$ denotes the repetition of the slot in frame $A_i'$ in multiframe i (i=0, . . . , 3). In FIGS. 5a-5c three examples are shown, where a SACCH block A is transmitted in four time slots of four SACCH frames $A_i'$ within four 26-frame multiframes, and a SACCH block a' is transmitted in four SACCH slots $a_i'$ within four 26-frame multiframes.

It is assumed that user u' is in DTX mode, and thus only the TDMA frames in VAMOS subchannel 1 and the SACCH slots $a_i'$ (corresponding to a' in FIGS. 3a and 3c) are illustrated. The repetition scheme of three examples in FIGS. 5a-5c can be applied also to the case where user u is in DTX mode and SACCH slots $a_i''$ are transmitted (see SACCH slot a" in FIG. 3b).

In FIG. 5a, for each of the four subsequent multiframes, the SACCH slot $a_i'$—in the respective multiframe is a repetition of the used slot of the SACCH frame $A_i'$ in the same respective multiframe. Please note that possibly not all four SACCH slots $a_i'$ are transmitted, e.g. due to priority of SID information. The receiver may then combine the partial redundant SACCH block with the original SACCH block as discussed above.

Alternatively, a repeated SACCH slot in at least one of the four subsequent multiframes is a repetition of the first SACCH slot of a different one of the four subsequent multiframes (see e.g. FIGS. 5b and 5c).

In FIG. 5b, the SACCH slot $a_3'$—in the first (i.e. i=0) of the subsequent multiframes is a repetition of the user's slot of the SACCH frame $A_3'$ in the fourth of the subsequent multiframes. The SACCH slot $a_2'$ in the second (i.e. i=1) of the subsequent multiframes is a repetition of the user's slot of the SACCH frame $A_2'$ in the third of the subsequent multiframes. The SACCH slot $a_1'$ in the third (i.e. i=2) of the subsequent multiframes is a repetition of the user's slot of the SACCH frame $A_1'$ in the second of the subsequent multiframes. The SACCH slot $a_0'$ in the fourth (i.e. i=3) of the subsequent multiframes is a repetition of the user's slot of the SACCH frame $A_0'$ in the first of the subsequent multiframes.

Compared to FIG. 5a, the repetition scheme in FIG. 5b yields larger time diversity when combining SACCH block A' and SACCH block a'. In addition, the repetition schemes enables the mobile station to deactivate the receiver if decoding was successful after receiving frames/slots $A_1'$, $a_4'$, $A_2'$ and $a_3'$ as transmitted in the first two multiframes with i=0 and i=1.

In FIG. 5c, the SACCH slot $a_2'$—in the first (i.e. i=0) of the subsequent multiframes is a repetition of the user's slot of the SACCH frame $A_2'$ in the third of the subsequent multiframes. The SACCH slot $a_3'$ in the second (i.e. i=1) of the subsequent multiframes is a repetition of the user's slot of the SACCH frame $A_3'$ in the fourth of the subsequent multiframes. The SACCH slot ad in the third (i.e. i=2) of the subsequent multiframes is a repetition of the user's slot of the SACCH frame $A_0'$ in the first of the subsequent multiframes. The SACCH slot $a_1'$ in the fourth (i.e. i=3) of the subsequent multiframes is a repetition of the user's slot of the SACCH frame $A_1$' in the second of the subsequent multiframes.

The repetition scheme in FIG. 5c results in the same absolute time separation between the original SACCH frame $A_1$' and the corresponding SACCH slot $a_i$' used for repetition. Similar to the repetition in FIG. 5b, also the repetition scheme in FIG. 5c also yields larger time diversity than the repetition scheme in FIG. 5a.

As described above, when a SACCH slot used for repetition would collide with a TCH or SID slot, the TCH or SID slot is transmitted. Therefore, it is possible that only a part of the SACCH block is repeated (in this case, the number of transmitted SACCH slots for repetition is less than 4). The MS may combine the received SACCH slot(s) which are detected as non-TCH or non-SID slots(s) with the user's time slots of the four SACCH frames A' to carry out partial repetition decoding.

Downlink Direction and Half Rate

As for full rate speech channels, SACCH performance can be also improved for half rate speech channels by using the concept as discussed above.

FIGS. 6a-6d illustrate an example for the DTX-based repeated SACCH scheme in case of TCH/HS and SACCH/HS.

In FIGS. 6a-6d, it is assumed that the GSM legacy SACCH mapping and decoding are kept for the half rate users in VAMOS subchannel 0. The SACCH frames in VAMOS subchannel 1 are shifted from the original frame positions (here: 12 and 25) used in VAMOS subchannel 0 to a different frame position, for example to frame 8 (for SACCH frame A1') and frame 22 (for SACCH frame A2'). Thus, the SACCH frame A1' of user u1' and the SACCH frame A2' of user u2' are preferably shifted from frame 12 to frame 8 and from frame 25 to frame 22, respectively, within VAMOS Subchannel 1.

FIGS. 6a-6d show an example for transmission of repeated SACCH information for half rate speech channels through silent TCH slots when DTX is switched on. The detection and decoding for half rate SACCH/HS is similar to those for full rate SACCH/FS as shown in FIG. 4.

Figures 6A, 6B, 6C, 6D:
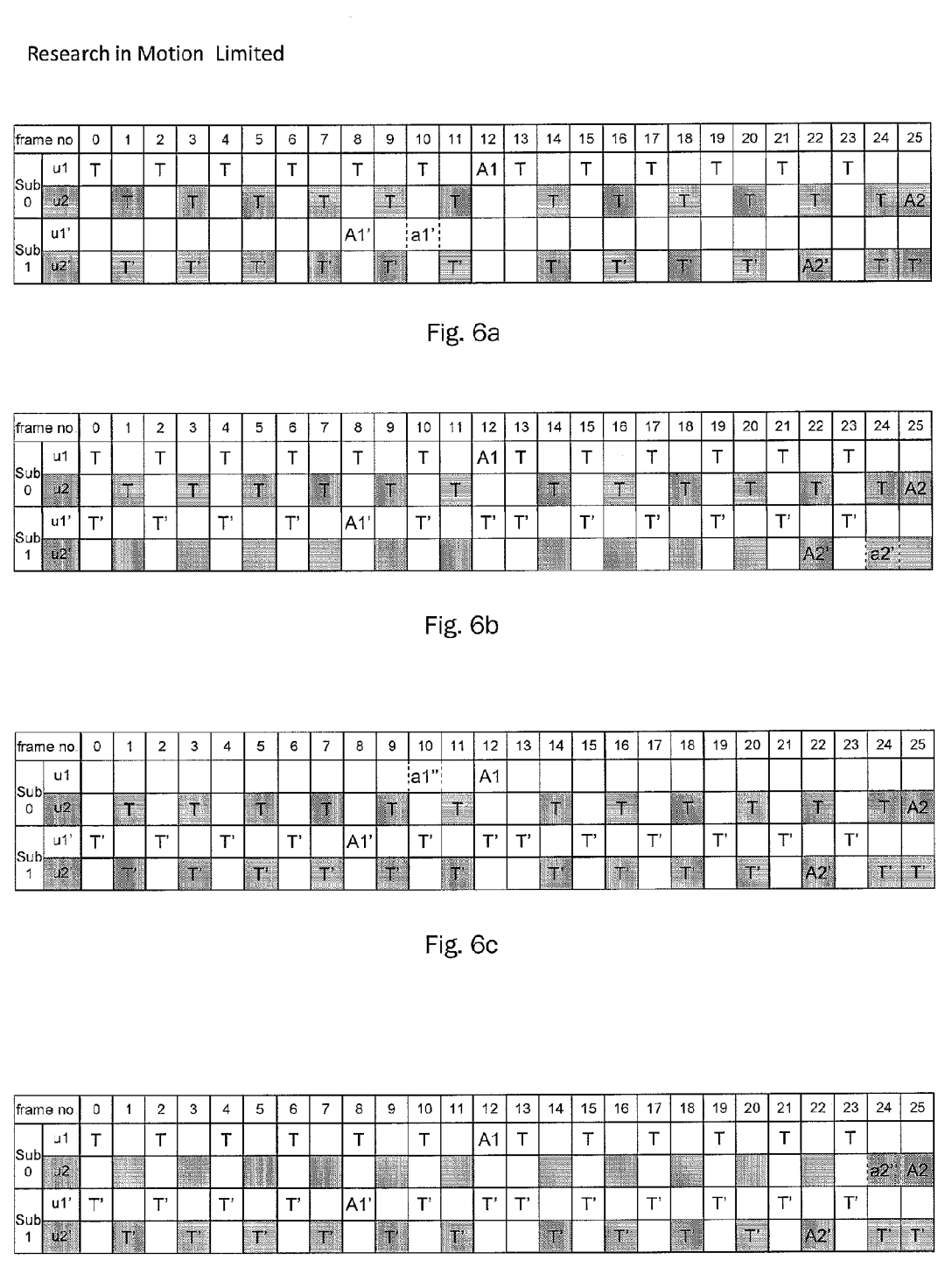

In FIG. 6a, the downlink connection of user u1' is in DTX mode. Similar to FIG. 3a, the slot of user u1' in SACCH frame A1' is repeated in SACCH slot a1', which is transmitted via VAMOS subchannel 1. E.g. SACCH slot a1' is transmitted in TDMA frame 10. It would be also possible to repeat the slot of SACCH frame A2', a2', in an empty time slot of user u1', e.g. in TDMA frame 23 (not shown), in frame 23 the ciphering key used for SACCH a2' is the same as what is used by user u2'.

In FIG. 6b, the downlink connection of user u2' is in DTX mode. Similar to FIG. 3a, the slot of user u2' in SACCH frame A2' is repeated in SACCH slot a2', which is transmitted via subchannel 1. E.g. SACCH slot a2' is transmitted in TDMA frame 24. It would be also possible to repeat the slot of SACCH frame A1', a1', in an empty time slot of user u2', e.g. in TDMA frame 11 (not shown), in frame 11 the ciphering key used for SACCH a1' is the same as what is used by user u1'.

In FIG. 6c, the downlink connection of user u1 is in DTX mode. Similar to FIG. 3b, the slot of user u1' in SACCH frame A1' is repeated in SACCH slot a1", which is transmitted via subchannel 0. E.g. SACCH slot a1" is transmitted in TDMA frame 10. It would be also possible to repeat the slot of SACCH frame A2', a2", in an empty time slot of user u1, e.g. in TDMA frame 23 (not shown), in frame 23 the ciphering key used for SACCH a2" is the same as what is used by user u2'.

In FIG. 6d, the downlink connection of user u2 is in DTX mode. Similar to FIG. 3b, the slot of user u2' in SACCH frame A2' is repeated in SACCH slot a2", which is transmitted via subchannel 0. E.g. SACCH slot a2" is transmitted in TDMA frame 24. It would be also possible to repeat the slot of SACCH frame A1', a1", in an empty time slot of user u2 e.g. in TDMA frame 11 (not shown), in frame 11 the ciphering key used for SACCH a1" is what is used by user u1'.

The decoding scheme discussed in connection with FIG. 4 and the repetition scheme discussed in connection with FIGS. 5a-5c can be applied in the same way to half rate speech channels.

Moreover, FIGS. 3a-3b show two full rate users and FIGS. 6a-6d show four half rate users. The concept discussed above can be also applied to the case of one full rate user and two half rate users; and to the case of three half rate users.

Uplink Direction

In the UL, when VAMOS subchannel 1 is in DTX mode, as in the DL, the VAMOS compliant mobile station in VAMOS subchannel 1 can transmit repeated SACCH through VAMOS subchannel 1.

However, when VAMOS subchannel 0 is in DTX mode, unlike in the DL, in the UL, the user in VAMOS subchannel 1 should not transmit repeated SACCH through VAMOS subchannel 0 since the user in VAMOS subchannel 1 cannot detect the DTX status of VAMOS subchannel 0.

FIGS. 7a-7c shows the DTX-based repeated SACCH method for full rate speech channels in the UL. FIGS. 7a-7c are identical to FIGS. 3a-3c besides one difference: Unlike FIG. 3b, in FIG. 7b the repetition of the slot of SACCH frame A' is missing. This is due to the fact that in the uplink direction the mobile station of user u' cannot detect whether subchannel 0 of user u is in DTX mode or not (however, in FIG. 3b the base station is capable to detect this in the downlink direction).

Besides this difference, the remarks to FIGS. 3a-3c in downlink direction also apply to FIGS. 7a-7c in uplink direction.

An embodiment of the DTX-based repeated SACCH scheme for half rate speech channels in the UL can be obtained by modifying FIGS. 6a-6d accordingly, i.e. by deleting SACCH slots a1" and a2". Besides this difference, the remarks to FIGS. 6a-6d in downlink direction also apply to uplink direction.

The procedures for detection and decoding of DTX-based repeated SACCH blocks for the UL are similar to those in the DL shown in FIG. 4. Moreover, the repetition scheme discussed in connection with FIGS. 5a-5c can be applied also for the UL.

Similar to the DL, if DTX-based repeated SACCH is incorrectly decoded at the receiver, Repeated SACCH (e.g. as discussed in cited document 3GPP TS 44.006) may be further activated by setting SACCH Repetition Order (SRO) in the next downlink SACCH block as "Repeated SACCH required".

Performance of DTX-Based Repeated SACCH

Since in DTX-based repeated SACCH, for the user in VAMOS subchannel 1 more SACCH information is transmitted within 480 ms during DTX mode, SACCH performance in DTX-based repeated SACCH is improved Complexity and Delay The complexity of the DTX-based repeated SACCH approach increases since more processes are needed for transmitting and receiving the repeated SACCH signals. However, DTX-based repeated SACCH may reduce the necessity to activate the Repeated SACCH feature; therefore it may decrease the averaged delays of SACCH decoding.

Figure 8:
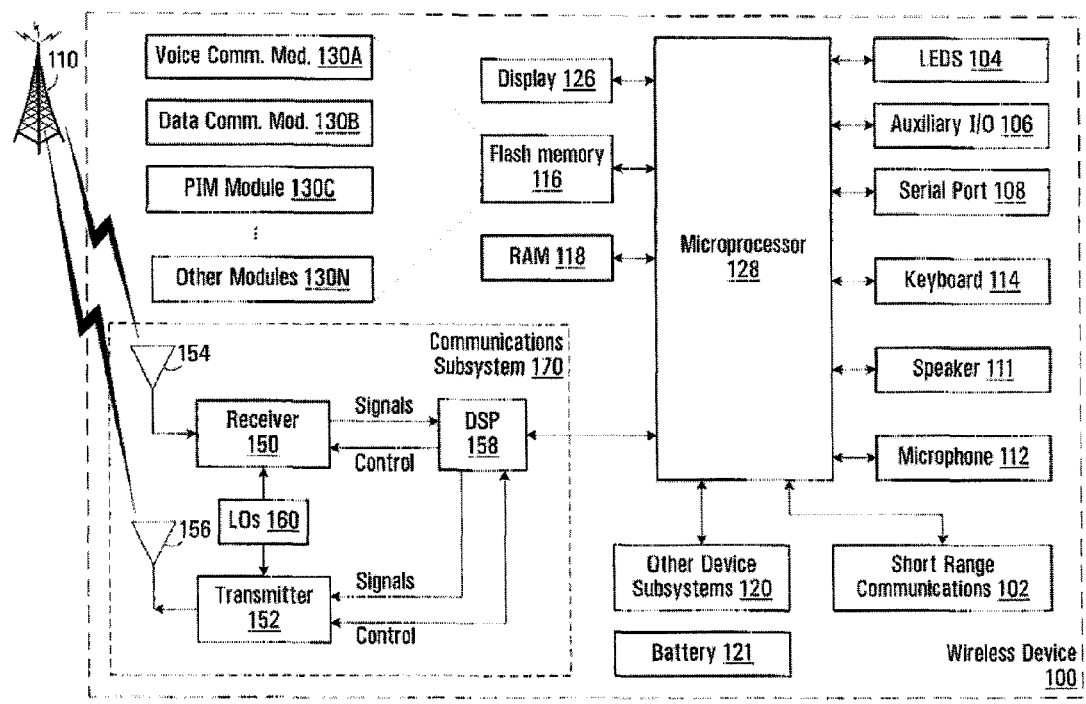
FIG. 8 illustrates an example of a mobile station.

FIG. 8 shows an a block diagram of a mobile station, user equipment or wireless device 100 that may, for example, implement any of the methods described in this disclosure. It is to be understood that the wireless device 100 is shown with very specific details for example purposes only. A processing device (a microprocessor 128) is shown schematically as coupled between a keyboard 114 and a display 126. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 includes functionality for implementing one or more of the embodiments described above in detail. The specific design and implementation of the communication subsystem 170 is dependent upon the communication network in which the wireless device 100 is intended to operate. For example, the communication subsystem 170 of the wireless device 100 may be designed to communicate with a GERAN base station. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. In GERAN or GPRS networks, network access is typically associated with a subscriber or user of a device.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

In some implementations, the wireless device 100 is capable of operating in multiple modes such that it can engage in both CS (Circuit-Switched) as well as PS (Packet-Switched) communications, and can transition from one mode of communications to another mode of communications without loss of continuity. Other implementations are possible.

In a particular embodiment, one or more of the above-described methods for communicating with a corresponding base station 110 are implemented by the communications subsystem 170, the microprocessor 128, the RAM 118, and the data communications module 130B, collectively appropriately configured to implement one of the methods described herein.

Figure 9:
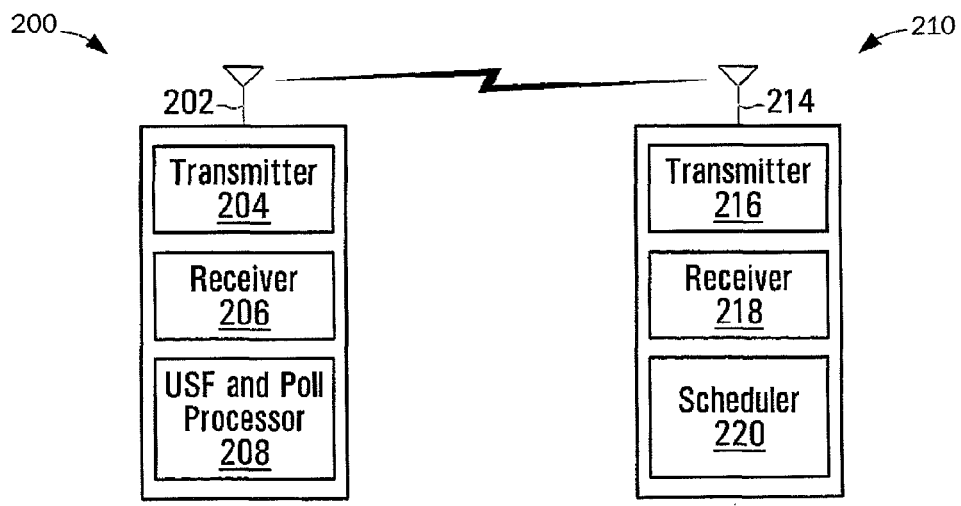
FIG. 9 illustrates an example of a system comprising a mobile station and a base station.

FIG. 9 is a block diagram of a system within which one or more of the embodiments described above may be implemented. There is a mobile station 200 in wireless communication with a network, as represented by network device or base station 210. As outlined in the context of FIG. 11, the mobile station 200 has at least one antenna 202, a transmitter 204 and a receiver 206 (which may be implemented together as a transceiver) and a controller 208. The network device or base station 210 has at least one antenna 214, a transmitter 216 and a receiver 218 (which may be implemented together as a transceiver) and a controller 220. The controllers 208, 220 may be implemented in hardware, or a combination of software and hardware, for example software running on a processor.

In the following further remarks regarding the preferred position of the shifted SACCH frame are given, e.g. shifting the SACCH frame from TDMA frame 12 to TDMA frame 8. The remarks are based on the disclosure in cited international patent application PCT/EP2009/060124.

The proposed shifting of SACCH allows to maintain the time structure and delay properties of currently used GERAN traffic channels where a speech block is transmitted within 8 successive TDMA frames. As such, the time for transmitting a speech block typically corresponds to 8 TDMA frames and the distance between the first frame and the last frame of a speech block is 7. However, frame number 12 of a multiframe carries the SACCH. By consequence, speech blocks which use the four TDMA frames prior to the SACCH frame and the four TDMA frames after SACCH frame require a time corresponding to 9 TDMA frames for transmission. In other words, the distance between the first frame and the last frame of a speech block is 8.

This distance or time relation can be maintained when shifting the SACCH frame as proposed, e.g. shifting the SACCH frame to frame 8. In this case, the distances from the first to the last TDMA frame carrying data from a given speech frame are the same as in the original mapping, 7 for TCH/FS and 8 if the TDMA frame reserved for SACCH is positioned between the first and second half of the data block.

This also applies for half rate channels. The distance from the first to the last TDMA frame carrying data from a given speech frame is 6 for TCH/HS and
7 if the TDMA frame reserved for SACCH is positioned between the first and second half of the data block. This relation also applies for the SACCH shifting described in the present document.

Overall, it may therefore be stated that the proposed SAACH shifting allows to maintain the delay properties of the currently used GSM control channel mapping. In particular, the variance or variation, i.e. the relation between maximum and minimum delay, as well as the maximum delay may be kept unchanged.

As a consequence, the proposed mapping allows that no additional buffering means at the base station, the mobile stations or both are required. As a matter of fact, it allows the use of the already available buffering means.

As described herein, the application describes a number of aspects, which are, without limitation, described below.

A first aspect of the application relates to a method for communication from a second mobile station to a base station or vice versa.

In a given multiframe, a first SACCH slot associated with the second mobile station is communicated (i.e. received or transmitted or both) via the second VAMOS subchannel. In the same multiframe, a redundant second SACCH slot associated with the second mobile station is communicated. The communicating step is performed either by the second mobile station or by the base station.

The second SACCH slot may be communicated via the second VAMOS subchannel, in case the second VAMOS subchannel is in DTX mode. In an alternative example, the second SACCH slot may be communicated via a first VAMOS subchannel, in case the first VAMOS subchannel is in DTX mode, wherein the first and second VAMOS subchannels share a common time slot and have the same carrier frequency. Both examples may be combined: I.e. in case the second VAMOS subchannel is in DTX mode, the second SACCH slot is communicated via the second VAMOS subchannel, and in case the first VAMOS subchannel is in DTX mode, the second SACCH slot may be communicated via the first VAMOS subchannel.

The redundant second SACCH slot may be used at the base station (in uplink direction) or at the second mobile station (in downlink direction) for decoding of the SACCH associated with the second mobile station. Due to the redundant SACCH information the performance of the SACCH transmission associated with the second mobile station is improved.

It is also possible that more than one redundant second SACCH slot is communicated, in the multiframe, via the second (first) VAMOS subchannel in case the second (first) VAMOS subchannel is in DTX mode.

According to a preferred example method, in the multiframe, a third SACCH slot is communicated via the first VAMOS subchannel. The third SACCH slot is associated with the first mobile station. The first SACCH slot is in a different TDMA frame than the third SACCH slot. Thus, the first and third SACCH slots do not share the same time slot and thus do not interfere each other.

If the first mobile station is VAMOS compliant, a redundant SACCH slot associated to the first mobile station may be communicated via the first VAMOS subchannel if the first VAMOS subchannel is in DTX mode or via the second VAMOS subchannel if the second VAMOS subchannel is in DTX mode.

In the following, several preferred decoding schemes are described:

According to a first decoding scheme, it is assumed that the second SACCH slot is communicated via the second VAMOS subchannel, when the second VAMOS subchannel is in discontinuous transmission mode. The second mobile station or the base station detects whether the second VAMOS subchannel is in discontinuous transmission mode and uses the second SACCH slot for decoding of a SACCH block if the second mobile station or the base station detects that the second VAMOS subchannel is in discontinuous transmission mode.

According to a second decoding scheme, it is assumed that the second SACCH slot is communicated via the second VAMOS subchannel, when the second VAMOS subchannel is in discontinuous transmission mode. It is further assumed that the second SACCH slot is communicated via the first VAMOS subchannel, when the first VAMOS subchannel is in discontinuous transmission mode and the second VAMOS subchannel is not in discontinuous transmission mode. The second mobile station detects whether the second VAMOS subchannel is in discontinuous transmission mode and uses the second SACCH slot in the second VAMOS subchannel for decoding of a SACCH block if the second mobile station detects that the second VAMOS subchannel is in discontinuous transmission mode. Otherwise, the second mobile station uses the second SACCH slot—if transmitted—in the first VAMOS subchannel for decoding of a SACCH block.

According to a third decoding scheme, it is assumed that a second SACCH slot is communicated via the second VAMOS subchannel, when the second VAMOS subchannel is in discontinuous transmission mode. It is further assumed that the second SACCH slot is communicated via the first VAMOS subchannel, when the first VAMOS subchannel is in discontinuous transmission mode and the second VAMOS subchannel is not in discontinuous transmission mode. The base station detects whether the second VAMOS subchannel is in discontinuous transmission mode. The base station uses the second SACCH slot in the second VAMOS subchannel for decoding of a SACCH block if the base station detects that the second VAMOS subchannel is in discontinuous transmission mode. The base station detects whether the first VAMOS subchannel is in discontinuous transmission mode and uses the second SACCH slot in the first VAMOS subchannel for decoding of a SACCH block if the base station detects that the first VAMOS subchannel is in discontinuous transmission mode and detects that the second VAMOS subchannel is not in discontinuous transmission mode.

Further preferred examples of the communication method are described herein.

A second aspect of the application relates to a base station. The features of the base station according to the second aspect of the application correspond to the features of the communication method according to the first aspect of the application.

The base station is configured to communicate with a first mobile station via a first VAMOS subchannel. The base station is further configured to communicate with a second mobile station via a second VAMOS subchannel. The communication may relate to receiving or transmitting or both. The first and second VAMOS subchannels share the same time slot per TDMA frame and have the same carrier frequency. The base station is further configured to use a first SACCH slot in the second VAMOS subchannel, the first SACCH slot associated with the second mobile station. The base station is further configured to use a redundant second SACCH slot, the second SACCH slot associated with the second mobile station. As discussed in connection with the method, the first and second SACCH slots are in the same multiframe.

The second SACCH slot may be communicated (i.e. transmitted or received) via the second VAMOS subchannel, in case the second VAMOS subchannel is in discontinuous transmission mode.

The second SACCH slot may be communicated (i.e. transmitted or received) via the first VAMOS subchannel, in case the first VAMOS subchannel is in DTX mode.

As discussed above, the second SACCH slot may be used at the base station (in uplink direction) or at the second mobile station (in downlink direction) for decoding of the SACCH associated with the second mobile station. This improves the performance of the SACCH transmission.

According to a preferred example of the base station, the base station is configured in such a way that—in the multiframe—a third SACCH slot is communicated via the first VAMOS subchannel. The third SACCH slot is associated with the first mobile station. The first SACCH slot is in a different TDMA frame than the third SACCH slot. Thus, the first and third SACCH slots do not share the same time slot and thus do not interfere.

Further preferred examples of the base station correspond to the preferred examples of the communication method described herein.

A third aspect of the application relates to a VAMOS compliant mobile station. The VAMOS compliant mobile station is configured to communicate (i.e. received or transmit) with a base station via a second VAMOS subchannel, with a first VAMOS subchannel and the second VAMOS subchannel sharing the same time slot per TDMA frame and having the same carrier frequency. The mobile station is configured to handle a first SACCH slot of the second VAMOS subchannel and a redundant second SACCH slot. The first and second SACCH slots are in the same multiframe. The second SACCH slot may be communicated via the second VAMOS subchannel, when the second VAMOS subchannel is in discontinuous transmission mode. The second SACCH slot may be communicated via the first VAMOS subchannel, when the first VAMOS subchannel being in discontinuous transmission mode.

Further preferred examples of the mobile station correspond to the preferred embodiments of the communication method discussed in the dependent method claims.

A fourth aspect and fifth aspect of the application relate to a transmitter configured to transmit a signal and a receiver configured to receive a signal, respectively. The transmitter may be part of the base station or a VAMOS compliant mobile station. The receiver may be part of the base station or a VAMOS compliant mobile station. The signal has a first SACCH slot in a second VAMOS subchannel and a redundant second SACCH slot, with the first and second SACCH slots being in the same multiframe. The second SACCH slot may be transmitted via the second VAMOS subchannel, with the second VAMOS subchannel being in DTX mode. The second SACCH slot may be transmitted via a first VAMOS subchannel, with the first VAMOS subchannel being in DTX mode.

Although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

ABBREVIATIONS

In the following, abbreviations used in the present application are listed:

| | |
|---|---|
| 3GPP | Third Generation Partnership Project |
| AMR | Adaptive Multi Rate |
| DTX | Discontinuous Transmission |
| EDGE | Enhanced Data rates for GSM Evolution |
| EFR | Enhanced Full Rate |
| FDD | Frequency Division Duplex |

-continued

| | |
|---|---|
| FR | Full Rate |
| GERAN | GSM EDGE Radio Access Network |
| GMSK | Gaussian Minimum Shift Keying |
| GSM | Global System for Mobile communications |
| HR | Half Rate |
| MS | Mobile Station |
| SACCH | Slow Associated Control Channel |
| SACCH/FS | SACCH associated with a full rate speech traffic channel |
| SACCH/HS | SACCH associated with a half rate speech traffic channel |
| SID | Silence Descriptor |
| TCH | Traffic Channel |
| TCH/FS | Traffic channel for full rate speech |
| TCH/HS | Traffic channel for half rate speech |
| TDMA | Time-Division Multiple Access |
| TSC | Training Sequence Code |
| VAD | Voice Activity Detection |
| VAMOS | Voice services over Adaptive Multi-user channels on One Slot |

The invention claimed is:

1. A method for communication from a second mobile station to a base station or vice versa, the method comprising:
communicating by the second mobile station or the base station, in a given multiframe,
a first SACCH (Slow Associated Control CHannel) slot associated with a TCH (Traffic CHannel) of the second mobile station via a second VAMOS (Voice services over Adaptive Multi-user on One Slot) subchannel, and
a redundant second SACCH slot associated with the same TCH of the second mobile station,
the second SACCH slot being communicated via the second VAMOS subchannel if the second VAMOS subchannel is determined to be in discontinuous transmission mode, and
the second SACCH slot being communicated via a first VAMOS subchannel if the first VAMOS subchannel is determined to be in discontinuous transmission mode, wherein the first and second VAMOS subchannels share a common time slot and have the same carrier frequency.

2. The method of claim 1, further comprising:
communicating, in the multiframe, a third SACCH slot associated with a first mobile station via the first VAMOS subchannel,
wherein the first SACCH slot is in a different TDMA frame than the third SACCH slot.

3. The method of claim 2, wherein
the first and second VAMOS subchannels are operated at full rate;
the first SACCH slot is communicated in TDMA frame number 8 of the multiframe, the TDMA frames of which being numbered from 0 to 25; and
the third SACCH slot is communicated in TDMA frame number 12 of the multiframe.

4. The method of claim 1, wherein
the first and second VAMOS subchannels are operated at full rate;
the second SACCH slot is communicated via the second VAMOS subchannel in TDMA frame 11 of the multiframe, the TDMA frames of which being numbered from 0 to 25, with the second VAMOS subchannel being in discontinuous transmission mode, or
the second SACCH slot is communicated via the first VAMOS subchannel in TDMA frame 10 of the multiframe, the TDMA frames of which being numbered from 0 to 25, with the first VAMOS subchannel being in discontinuous transmission mode.

5. The method of claim 1, wherein the first and second VAMOS subchannels are operated at half rate; and
the first SACCH slot is communicated in TDMA frame number 8 of the multiframe, the TDMA frames of which being numbered from 0 to 25, and the third SACCH slot is communicated in TDMA frame number 12 of the multiframe, or
the first SACCH slot is communicated in TDMA frame number 22 of the multiframe, the TDMA frames of which being numbered from 0 to 25, and the third SACCH slot is communicated in TDMA frame number 25 of the multiframe.

6. The method of claim 5, wherein
the first SACCH slot is communicated in TDMA frame number 8 of the multiframe, the third SACCH slot is communicated in TDMA frame number 12 of the multiframe and the second SACCH slot is communicated in TDMA frame number 10, with the second VAMOS subchannel being in discontinuous transmission mode, or
the first SACCH slot is communicated in TDMA frame number 22 of the multiframe, the third SACCH slot is communicated in TDMA frame number 25 of the multiframe and the second SACCH slot is communicated in TDMA frame number 24, with the second VAMOS subchannel being in discontinuous transmission mode, or
the first SACCH slot is communicated in TDMA frame number 8 of the multiframe, the third SACCH slot is communicated in TDMA frame number 12 of the multiframe and the second SACCH slot is communicated in TDMA frame number 10, with the first VAMOS subchannel being in discontinuous transmission mode, or
the first SACCH slot is communicated in TDMA frame number 22 of the multiframe, the third SACCH slot is communicated in TDMA frame number 25 of the multiframe and the second SACCH slot is communicated in TDMA frame number 24, with the first VAMOS subchannel being in discontinuous transmission mode.

7. The method of claim 1, where a SACCH block associated with the second mobile station is encoded in four first SACCH slots of four subsequent multiframes.

8. The method of claim 7, wherein—for each of the four subsequent multiframes—the second SACCH slot—if communicated—in the respective multiframe is a repetition of the first SACCH slot in the same respective multiframe.

9. The method of claim 7, wherein the second SACCH slot in at least one of the four subsequent multiframes is a repetition of the first SACCH slot of a different one of the four subsequent multiframes.

10. The method of claim 9, wherein
the second SACCH slot—if communicated—in the first of the subsequent multiframes is a repetition of the first SACCH slot in the fourth of the subsequent multiframes;
the second SACCH slot—if communicated—in the second of the subsequent multiframes is a repetition of the first SACCH slot in the third of the subsequent multiframes;
the second SACCH slot—if communicated—in the third of the subsequent multiframes is a repetition of the first SACCH slot in the second of the subsequent multiframes; and
the second SACCH slot—if communicated—in the fourth of the subsequent multiframes is a repetition of the first SACCH slot in the first of the subsequent multiframes.

11. The method of claim 9, wherein
the second SACCH slot—if communicated—in the first of the subsequent multiframes is a repetition of the first SACCH slot in the third of the subsequent multiframes;

the second SACCH slot—if communicated—in the second of the subsequent multiframes is a repetition of the first SACCH slot in the fourth of the subsequent multiframes;

the second SACCH slot—if communicated—in the third of the subsequent multiframes is a repetition of the first SACCH slot in the first of the subsequent multiframes; and the second SACCH slot—if communicated—in the fourth of the subsequent multiframes is a repetition of the first SACCH slot in the second of the subsequent multiframes.

12. The method of claim 7, wherein each second SACCH slot—if transmitted—of the four subsequent multiframes is a repetition of a respective first SACCH slot within the four subsequent multiframes; and the SACCH block is decoded by using the second SACCH slot of at least one of the four subsequent multiframes.

13. The method of claim 12, wherein the SACCH block associated with the second mobile station is encoded in the four second SACCH slots of the four subsequent multiframes; and the SACCH block is decoded by decoding the four second SACCH slots of the four subsequent multiframes.

14. The method of claim 12, wherein the SACCH block is decoded by combining at least one of the first SACCH slots and at least one of the transmitted second SACCH slots.

15. The method of claim 1, wherein the second mobile station is a VAMOS compliant mobile station and a first mobile station is not a VAMOS compliant mobile station, wherein the base station and the first mobile station communicate via the first VAMOS subchannel.

16. The method of claim 7, wherein the method further comprises:

repeating the SACCH block after said four subsequent multiframes.

17. The method of claim 1, wherein the first and second SACCH slots are communicated in downlink direction from the base station to the second mobile station.

18. The method of claim 1, wherein the first and second SACCH slots are communicated in uplink direction from the second mobile station to the base station; and the second SACCH slot is communicated via the second VAMOS subchannel, with the second VAMOS subchannel being in discontinuous transmission mode.

19. A base station configured to communicate with a first mobile station via a first VAMOS subchannel, communicate with a second mobile station via a second VAMOS subchannel, with the first and second VAMOS subchannels sharing a common time slot and having the same carrier frequency, and utilize a first SACCH slot in the second VAMOS subchannel, the first SACCH slot associated with a TCH of the second mobile station, and a redundant second SACCH slot, the second SACCH slot associated with the same TCH of the second mobile station, the first and second SACCH slots being in the same multiframe, wherein the second SACCH slot is communicated via the second VAMOS subchannel if the second VAMOS subchannel is in discontinuous transmission mode, and the second SACCH slot is communicated via the first VAMOS subchannel if the first VAMOS subchannel is in discontinuous transmission mode.

20. A VAMOS compliant mobile station configured to communicate with a base station via a second VAMOS subchannel, with a first VAMOS subchannel and the second VAMOS subchannel sharing a common time slot and having the same carrier frequency, and utilize a first SACCH slot of the second VAMOS subchannel, the first SACCH slot associated with a TCH of the mobile station, and a redundant second SACCH slot, the second SACCH slot associated with the same TCH of the mobile station, the first and second SACCH slots being in the same multiframe, wherein the second SACCH slot is communicated via the second VAMOS subchannel if the second VAMOS subchannel is in discontinuous transmission mode, and the second SACCH slot is communicated via the first VAMOS subchannel if the first VAMOS subchannel is in discontinuous transmission mode.

21. A transmitter configured to:

transmit a first SACCH slot associated with a TCH in a second VAMOS subchannel of a signal, and transmit a redundant second SACCH slot associated with the same TCH, with the first and second SACCH slots being in the same multiframe, the second SACCH slot being communicated via the second VAMOS subchannel of the signal if the second VAMOS subchannel is in discontinuous transmission mode, and the second SACCH slot being communicated via a first VAMOS subchannel of the signal if the first VAMOS subchannel is in discontinuous transmission mode, wherein the first and second VAMOS subchannels share a common time slot and have the same carrier frequency.

22. A receiver configured to:

receive a first SACCH slot associated with a TCH in a second VAMOS subchannel of a signal, and receive a redundant second SACCH slot associated with the same TCH, with the first and second SACCH slots being in the same multiframe, the second SACCH slot being communicated via the second VAMOS subchannel of the signal if the second VAMOS subchannel is in discontinuous transmission mode, and the second SACCH slot being communicated via a first VAMOS subchannel of the signal if the first VAMOS subchannel is in discontinuous transmission mode, wherein the first and second VAMOS subchannels share a common time slot and have the same carrier frequency.

23. The method of claim 1, wherein the first and second VAMOS subchannels are operated at half rate; and the second SACCH slot is communicated in TDMA frame number 10, with the second VAMOS subchannel being in discontinuous transmission mode, or the second SACCH slot is communicated in TDMA frame number 24, with the second VAMOS subchannel being in discontinuous transmission mode, or the second SACCH slot is communicated in TDMA frame number 10, with the first VAMOS subchannel being in discontinuous transmission mode, or the second SACCH slot is communicated in TDMA frame number 24, with the first VAMOS subchannel being in discontinuous transmission mode.

24. The method of claim 1, wherein
the second SACCH slot is communicated via the second VAMOS subchannel, when the second VAMOS subchannel is in discontinuous transmission mode,
the second mobile station or the base station detects whether the second VAMOS subchannel is in discontinuous transmission mode and uses the second SACCH slot for decoding of a SACCH block if the second mobile station or the base station detects that the second VAMOS subchannel is in discontinuous transmission mode.

25. The method of claim 1, wherein
the second SACCH slot is communicated via the second VAMOS subchannel, when the second VAMOS subchannel is in discontinuous transmission mode,
the second SACCH slot is communicated via the first VAMOS subchannel, when the first VAMOS subchannel is in discontinuous transmission mode and the second VAMOS subchannel is not in discontinuous transmission mode,
the second mobile station
   detects whether the second VAMOS subchannel is in discontinuous transmission mode and
   uses the second SACCH slot in the second VAMOS subchannel for decoding of a SACCH block if the second mobile station detects that the second VAMOS subchannel is in discontinuous transmission mode and
   uses the second SACCH slot—if transmitted—in the first VAMOS subchannel for decoding of a SACCH block otherwise.

26. The method of claim 1, wherein
the second SACCH slot is communicated via the second VAMOS subchannel, when the second VAMOS subchannel is in discontinuous transmission mode,
the second SACCH slot is communicated via the first VAMOS subchannel, when the first VAMOS subchannel is in discontinuous transmission mode and the second VAMOS subchannel is not in discontinuous transmission mode,
the base station
   detects whether the second VAMOS subchannel is in discontinuous transmission mode,
   uses the second SACCH slot in the second VAMOS subchannel for decoding of a SACCH block if the base station detects that the second VAMOS subchannel is in discontinuous transmission mode,
   detects whether the first VAMOS subchannel is in discontinuous transmission mode, and
   uses the second SACCH slot in the first VAMOS subchannel for decoding of a SACCH block if the base station detects that the first VAMOS subchannel is in discontinuous transmission mode and detects that the second VAMOS subchannel is not in discontinuous transmission mode.

* * * * *